(12) United States Patent
Curran

(10) Patent No.: US 10,578,233 B2
(45) Date of Patent: Mar. 3, 2020

(54) PULLING DEVICE FOR FLEXIBLE CONDUIT TUBING

(71) Applicant: Patrick George Curran, Thunder Bay (CA)

(72) Inventor: Patrick George Curran, Thunder Bay (CA)

( * ) Notice: Subject to any disclaimer, the term of this patent is extended or adjusted under 35 U.S.C. 154(b) by 265 days.

(21) Appl. No.: 15/499,139

(22) Filed: Apr. 27, 2017

(65) Prior Publication Data

US 2017/0321823 A1    Nov. 9, 2017

(30) Foreign Application Priority Data

May 9, 2016 (CA) ..................................... 2929579

(51) Int. Cl.
| | | |
|---|---|---|
| *F16L 5/00* | (2006.01) | |
| *B25B 27/28* | (2006.01) | |
| *B25B 27/06* | (2006.01) | |
| *F16L 55/165* | (2006.01) | |
| *H02G 1/08* | (2006.01) | |
| *F16L 1/06* | (2006.01) | |
| *F24D 3/12* | (2006.01) | |
| *F16L 11/06* | (2006.01) | |

(52) U.S. Cl.
CPC ................ *F16L 5/00* (2013.01); *B25B 27/06* (2013.01); *B25B 27/28* (2013.01); *F16L 1/06* (2013.01); *F16L 55/1658* (2013.01); *H02G 1/081* (2013.01); *F16L 11/06* (2013.01); *F24D 3/12* (2013.01); *Y02B 30/24* (2013.01)

(58) Field of Classification Search
CPC ... F16L 1/06; H02G 1/081; B66C 1/56; B66C 1/54; B25J 15/12

USPC .................... 294/96; 254/134.3 FT, 134.3 R; 405/184, 184.3; 138/97
See application file for complete search history.

(56) References Cited

U.S. PATENT DOCUMENTS 2,687,324 A * 8/1954 Grunsky ................... F16L 1/09
    294/96
3,330,853 A * 7/1967 Harris ................... C07C 255/00
    558/359

(Continued)

FOREIGN PATENT DOCUMENTS

| CA | 2929579 | * | 5/2016 |
| DE | 4003747 | * | 8/1991 |

*Primary Examiner* — Monica S Carter
*Assistant Examiner* — Mahdi H Nejad
(74) *Attorney, Agent, or Firm* — Ryan W. Dupuis; Ade + Company Inc.; Kyle R. Satterthwaite

(57) ABSTRACT

A pipe pulling device guides extruded plastic conduit tubing through a building structure. The device has a fastener body including a main shaft supporting a resilient expansion sleeve thereon that can be inserted into an open end of the tubing. A nut is threaded onto the main shaft for axially compressing the expansion sleeve between the nut and a fastener head at the inner end of the main shaft to radially expand the sleeve within the tubing and frictionally grip the fastener body relative to the tubing. The nut is tapered outwardly and supports an elongate, rigid tip body extending longitudinally outward from the tubing to guide insertion of the tubing through cavities in the building structure. Various accessories can be secured to the nut or the tip body to assist insertion of the pipe pulling device through different building structures.

12 Claims, 15 Drawing Sheets

(56) References Cited

U.S. PATENT DOCUMENTS

| | | | | | |
|---|---|---|---|---|---|
| 3,709,546 | A | * | 1/1973 | Vaughan | B66C 1/54 279/2.15 |
| 4,684,161 | A | * | 8/1987 | Egner | G02B 6/4439 254/134.3 FT |
| 5,597,192 | A | * | 1/1997 | Smith | E21B 7/20 294/96 |
| 5,647,627 | A | * | 7/1997 | Baessler | B66C 1/56 294/96 |
| 5,687,954 | A | * | 11/1997 | Schroeder | H02G 1/08 254/134.3 FT |
| 5,915,770 | A | * | 6/1999 | Bergstrom | H02G 1/00 254/134.3 R |
| 7,396,060 | B2 | * | 7/2008 | Huncovsky | F16L 1/06 294/96 |
| 7,985,037 | B2 | * | 7/2011 | Duggan | E02F 5/10 285/411 |
| 2006/0027795 | A1 | * | 2/2006 | Crawford | H02G 1/081 254/134.3 FT |
| 2007/0222245 | A1 | * | 9/2007 | Maffeis | B25J 15/12 294/93 |

* cited by examiner

PULLING DEVICE FOR FLEXIBLE CONDUIT TUBING

This application claims foreign priority benefits from Canadian Patent Application 2,929,579, filed May 9, 2016.

FIELD OF THE INVENTION

The present invention relates to a device for pulling flexible conduit tubing, for example plastic plumbing tubing such as PEX™ tubing, and more particularly the present invention relates to a pulling device having an expansion portion for being mounted into one end of the tubing to grip the tubing by expansion and a penetrating tip portion for guiding insertion of the tubing through an internal cavity within a building structure such as a wall, a floor, and the like.

BACKGROUND

PEX™ plumbing (or crosslinked polyethylene) is part of a water supply piping system that has several advantages over metal pipe (copper, iron, lead) or rigid plastic pipe (PVC, CPVC, ABS) systems. It is flexible, resistant to scale and chlorine, doesn't corrode or develop pinholes, is faster to install than metal or rigid plastic, and has fewer connections and fittings.

PEX™ tubing is made from crosslinked HDPE (high density polyethylene) polymer. The HDPE is melted and continuously extruded into tube. The crosslinking of the HDPE is accomplished in one of three different methods.

PEX™ plumbing has been in use in Europe since about 1970, and was introduced in U.S.A. around 1980. The use of PEX™ has been increasing ever since, replacing copper pipe in many applications, especially radiant heating systems installed in the slab under floors or walkways. Interest in PEX™ for hot and cold water plumbing has increased recently in the United States.

Flexible PEX™ tube is manufactured by extrusion, and shipped and stored on spools, where rigid plastic or metal piping must be cut to some practical length for shipping and storage. This leads to several advantages, including lower shipping and handling costs due to decreased weight and improved storage options.

PEX™ plumbing installations require fewer fittings than rigid piping. The flexible tubing can turn 90 degree corners without the need for elbow fittings, and PEX™ tubing unrolled from spools can be installed in long runs without the need for coupling fittings.

The terms PEX™ pipe and PEX™ tube have been used by persons of skill in the art interchangeably, however some manufacturers distinguish between the two by manufacturing to different inside/outside diameters. The term PEX™ tubing when used herein is intended to refer generally to either PEX™ pipe or PEX™ tube.

Some applications require PEX™ with added oxygen barrier properties. Radiant floor heating (or hydronic heating systems) may include some ferrous (iron-containing) components which will corrode over time if exposed to oxygen. Since standard PEX™ tubing allows some oxygen to penetrate through the tube walls, various "Oxygen Barrier PEX™" tubing has been designed to prevent diffusion of oxygen into these systems.

As with PEX™ Tubing Corrugated Stainless Steel Tubing (CSST) is growing in popularity, and like PEX™ tubing is being used in both new construction and renovations of older buildings. Although the cost of this material is higher than regular pipe, the ease of installation, lack of joints and labour cots is making this material more attractive to the consumer. Once again like PEX™ tubing, this tubing is shipped in round coils or spools, and can become very difficult to push through joist and wall spaces. Corrugated Stainless Steel Tubing comes in many trade names, here is a few of them: Tracpipe™, Pro-Flex™ and Gastite™.

It is common during new construction and during renovations of buildings to use PEX™ Tubing to transmit domestic and heating, hot and cold water, from fixture to fixture. PEX™ Tubing is an excellent product for this purpose and its use is growing in popularity every year. The application we are interested is its flexibility and ability to be installed from fixture to fixture in continuously without or using only a few fittings. Due to this flexibility, the PEX™ Tubing has the ability to be inserted continuously through both large and small wall and floor cavities even ones filled with insulation.

The problem that does arise with PEX™ Tubing due to its continuous nature and requirement to be stored on rolls, is that this storage method causes the tubing to form a curvature. In essence this means the tubing, in it's natural state, is not straight like pipe. When attempting to straighten this PEX™ Tubing it just returns to its natural curvature. When this PEX™ Tubing is inserted into a wall or floor cavity, it is not straight but rather curved making this extremely difficult to line up. The PEX™ Tubing end is generally pointed away from the other side of the wall cavity where there is a hole or a point on the opposite wall the PEX™ Tubing is to go to or through.

SUMMARY OF THE INVENTION

The present invention seeks to overcome at least some of the disadvantages of trying to insert and feed PEX™ Tubing through enclosed wall and floor spaces.

According to one aspect of the invention there is provided a pipe pulling device for guiding conduit tubing through a building structure, the pipe pulling device comprising:

a fastener body including a main shaft having a shaft diameter extending longitudinally between a head at a first end of the main shaft which is enlarged relative to the shaft diameter and an opposing second end of the main shaft in which at least a portion of the main shaft adjacent the second end is externally threaded;

an expansion sleeve supported about the main shaft having an outer diameter which is receivable within an open end of the conduit tubing;

a nut threaded onto the second end of the main shaft such that the expansion sleeve is longitudinally abutted between the head of the fastener body and the nut, the nut being longitudinally tapered from a first end of the nut adjacent the expansion sleeve having an outer diameter which is greater than an outer diameter of the conduit tubing to a second end of the nut having an outer diameter which is less than the outer diameter of the first end of the nut; and an elongate tip body including a main portion extending longitudinally from the second end of the nut having a constant outer diameter which is less than the outer diameter of the first end of the nut to a tip portion of the tip body which is distal from the nut and which is tapered to an apex.

Preferably the elongate tip body is supported to be readily separable from the fastener body and the nut. For example, the elongate tip body may be connected threadably to the main shaft of the fastener body. In this instance, The nut may include a threaded bore extending therethrough for threaded connected to the main shaft of the fastener body and a counter bore at the second end of the nut in alignment with the threaded bore and which receives an end of the elongate tip body therein.

The constant outer diameter of the elongate tip body and the outer diameter of the nut at the second end of the nut is preferably less than the outer diameter of the tubing.

Preferably the nut has a generally conical tapered outer surface and two gripping surfaces that are parallel to one another and located at diametrically opposed sides of the outer surface for gripping with a wrench.

The expansion sleeve is preferably formed of a resilient material, for example rubber, which is arranged to be radially expanded when compressed in the axial direction.

The expansion sleeve may have a textured outer surface for gripping the tubing to resist relative rotation between the sleeve and the surrounding conduit tubing.

In some embodiments, an additional wear collar of rigid material is supported about the main shaft of the fastener body in axial abutment between the expansion sleeve and the nut for alignment with a cut edge at an open end of the conduit tubing. The wear collar may include a main portion having an outer diameter near to the outer diameter of the expansion sleeve and a sleeve portion reduced in outer diameter relative to the main portion such that the sleeve portion is arranged to be received radially between the main shaft of the fastener body and the expansion sleeve along a portion of an axial length of the expansion sleeve.

The tip body may include a transverse aperture extending diametrically therethrough adjacent to the tip portion of the tip body.

In some embodiments, the tip body comprises a plurality of modular sections having the constant outer diameter and being supported longitudinally in abutment with one another between the nut and the tip portion, in which each modular section is connected to adjacent sections by a threaded connected to so as to be readily separable to vary an overall length of the tip body.

A needle tip may be additionally mounted on the apex of the tip body in which the needle tip has a reduced diameter relative to the constant outer diameter of the tip body so as to be suited for penetration through wall finishing material. The needle tip may be supported within a bore in the tip body so as to be readily removeable from the tip body.

The device may be further provided with a clevis tip which is arranged to be mounted on the nut interchangeably with the tip body, in which the clevis tip includes a clevis formed thereon which is adapted to be releasably secured to a spade bit.

BRIEF DESCRIPTION OF THE DRAWINGS

Various embodiments of the invention will now be described in conjunction with the accompanying drawings in which.

In the drawings like characters of reference indicate corresponding parts in the different figures.

DETAILED DESCRIPTION

Figure 1:
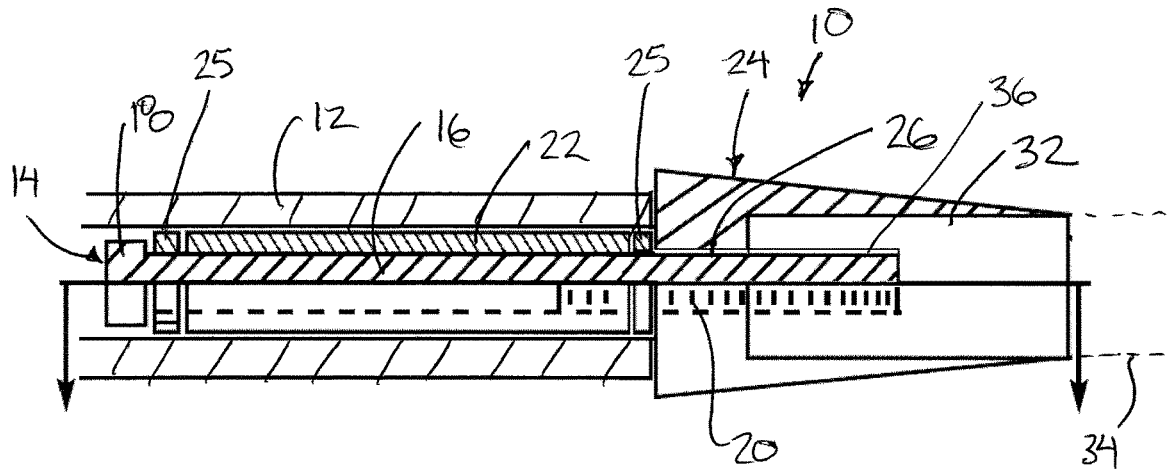
FIG. 1 is a sectional view of the pipe pulling device supported within the end of conduit tubing.

Referring to the accompanying figures there is illustrated a pipe pulling device generally indicated by reference numeral 10. The device 10 is particularly suited for use with conduit tubing 12, for example elongate extruded plastic pipe or tube commonly available in large rolls under the tradename PEX™ and which is suited for use as a conduit for various fluid including plumbing applications, gas conduits, and the like.

The device 10 includes a main fastener body 14 in the form of a bolt having a main shaft 16 which is elongate in a longitudinal direction between a head 18 at a first end of the shaft that is increased in outer diameter relative to the main shaft and a threaded portion 20 along an outer surface of the main shaft adjacent the opposing second end thereof.

An expansion sleeve 22 is provided for mounting about most of the length of the main shaft between the head 18 at the first end and the threaded portion 20 towards the second end. The expansion sleeve is elongate and tubular and is formed as a single piece of resilient, elastic material, for example rubber. The sleeve is suitably sized such that the interior diameter closely matches the outer diameter of the main shaft and the outer diameter in a relaxed position closely fits within the interior diameter of the conduit tubing. The expansion sleeve is shorter in length than the main shaft such that an end portion of the main shaft that is externally threaded remains protruding beyond the end of the sleeve in the assembled configuration.

A nut 24 is threaded onto the second end of the shaft of the fastener body opposite the head. The nut 24 includes a main bore 26 extending fully through the nut which is internally threaded and sized for mating with the threaded portion of the fastener body 14 to form a threaded connection therebetween. The nut 24 is threaded onto the fastener body so as to enable the expansion sleeve 22 to be axially compressed between the nut 24 and the head 18 of the fastener body. The material of the expansion sleeve is suitable so as to be radially expanded as the sleeve is axially compressed between the nut 24 and the head 18.

A pair of washers 25 are provided as flat, annular discs of rigid metal material which are supported about the main shaft of the fastener body at opposing ends of the expansion sleeve. Each washer has an outer diameter which is near to but slightly less than an outer diameter of the expansion sleeve in a relaxed state.

In use, the user inserts the expansion sleeve portion of the pipe pulling device into the open end of the conduit tubing so that the cut end of the tubing nearly abuts the nut. The expansion sleeve has a sufficient coefficient of friction to be frictionally gripped relative to the surrounding conduit tubing to resist relative rotation therebetween, as well as resisting relative rotation between the expansion sleeve and the fastener body 14 received therethrough. In this manner, rotating the nut relative to the conduit tubing gripped in the hand of the user enables the axial compression and radial expansion of the sleeve to increase the frictional gripping between the pipe pulling device and the surrounding conduit tubing.

The nut 24 has an outer surface which is generally frustoconical in shape so as to be tapered in outer diameter from a first end for abutment against the end of the expansion sleeve 22 to an opposing second end. The outer diameter at the first end is greater than the outer diameter of the expansion sleeve and the head of the fastener body so as to be near to or preferably greater than the outer diameter of the conduit tubing. At the second end, the outer diameter is reduced relative to the first end, preferably so as to be reduced in diameter relative to the conduit tubing.

A series of grooves 28 are formed at circumferentially spaced positions about the full circumference of the nut 24 in a circumferential band adjacent the second end of the nut at the location of greatest diameter so as to be suitably positioned for gripping in the hand of a user to rotate the nut and axially compress the expansion sleeve.

The nut 24 also includes two grip surfaces 30 formed at an intermediate location thereon between the first and second ends in which the two grip surfaces are parallel to one another and a long axis of the main shaft at diametrically opposing sides of the nut. The two grip surfaces are thus suitably arranged for gripping with a wrench to assist in rotating the nut relative to the fastener body and the expansion sleeve received within the conduit tubing.

A counter bore 32 is located at the second end of the body of the nut in concentric alignment with the main threaded bore receiving the shaft therein. The counter bore 32 is increased in diameter relative to the main bore and defines a cylindrical socket which is open to the second end of the nut body and which has an interior diameter which is near the outer diameter at the second end of the body of the nut so that the wall thickness about the nut tapers to an edge about the open end of the socket.

The pipe pulling device 10 further includes a tip body 34 in the form of an elongate rigid cylindrical rod formed in one or more sections having a constant outer diameter along the full length thereof which is equal to the inner diameter of the counter bore 32. The first end of the tip body 34 includes an internally threaded bore 36 formed therein which is sized and threaded for forming a threaded connection with the end of the main shaft 16 of the fastener body. In this manner, the second end portion of the main shaft of the fastener body protrudes outwardly beyond the expansion sleeve 22 sufficiently to pass fully through the main bore of the nut 24 and protrude into the socket formed by the counter bore 32 for mating connection with the first end of the tip body 34 received within the socket of the counter bore 32.

The opposing second end of the tip body 34 includes a tip portion 38 formed thereon in which the outer diameter is tapered from the constant diameter along the main portion of the elongate tip body to a pointed apex 40. A transverse aperture 42 extends diametrically through the tip body 34 in close proximity to the tip portion 38 to receive a transverse retainer pin 44 slidably and selectively inserted therethrough.

A mounting bore 46 is formed in the tip body to extend axially inward from the apex 40. A needle tip 48 is longitudinally slidable into the mounting bore 46 to protrude longitudinally outward therefrom in a mounted position. A set screw 50 is received through a radial bore for threaded connection into the tip body for operative connection with the needle tip to selectively retain the needle tip relative to the tip body when tightened while enabling the needle tip to be readily slidably removed from the tip body when desired by loosening the set screw. The needle tip is an elongate rigid member of constant diameter which is reduced relative to the outer diameter of the main tip body so as to be better suited for penetration through some wall finishing materials, for example wall board or drywall and the like.

In some embodiments, the elongate constant diameter rod forming the main portion of the tip body 34 is formed as a plurality of modular sections 52 abutted longitudinally in series with one another. Each modular section is a solid rod having threaded connectors at opposing ends thereof to form threaded connections with adjacent ones of the modular sections or to form a threaded connection with the main shaft of the fastener body 14. In the illustrated embodiment, both ends of each modular section comprises an internally threaded bore so that an additional threaded shaft connector is provided as a male coupling between the female couplings at the ends of each modular section. Alternatively, each modular section may be provided with a male threaded connector at one end and a female threaded connector at the opposing end to similarly allow a plurality of modular sections to be connected in series with one another. In this instance, one of the modular sections may be a dedicated end section which integrally includes the tip portion 38 formed at one end thereof which is configured to selectively receive the needle tip 48 therein and which is configured to locate the transverse aperture 42 therein for receiving the retainer pin 44 in use.

Figure 2:
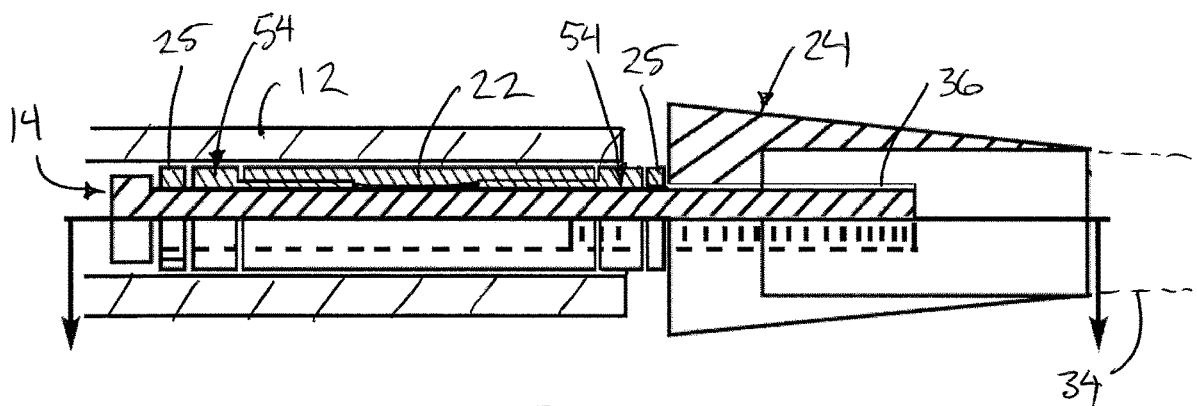
FIG. 2 is a sectional view of the pipe pulling device according to FIG. 1, including an optional wear collar supported thereon.

As shown in the embodiment of FIG. 2, the device 10 additionally includes a pair of wear collars 54, supported at opposing ends of the expansion sleeve. The wear collars are each typically formed of a unitary piece of rigid metal, for example brass and includes a collar portion 56 received about the main shaft of the fastener body between the end of the expansion sleeve and the corresponding washer 25 in which the outer diameter is equal to or slightly greater than the outer diameter of the expansion sleeve in the relaxed state. The outer diameter remains constant in the axial direction. Length of the collar portion 56 in the axial direction is several times greater than the corresponding thickness of the washer 25. In this manner, the collar portion 56 of one of the wear collars at the second end of the fastener body is suitably arranged for alignment with the cut end of the conduit tubing so that any sharp edges at the end of the conduit tubing are engaged upon the rigid material of the wear collar instead of the resilient material of the expansion sleeve to protect the expansion sleeve from damage. The wear collars each also include a sleeve portion 58 extending axially inward from the collar portion along the main shaft towards the other wear collar. The sleeve portion has a reduced outer diameter relative to the collar portion and is suitably sized to be received radially between the main shaft received therethrough and the expansion sleeve which surrounds the sleeve portion. The sleeve portion assists in locating the collar portion relative to the expansion sleeve.

Figure 3:
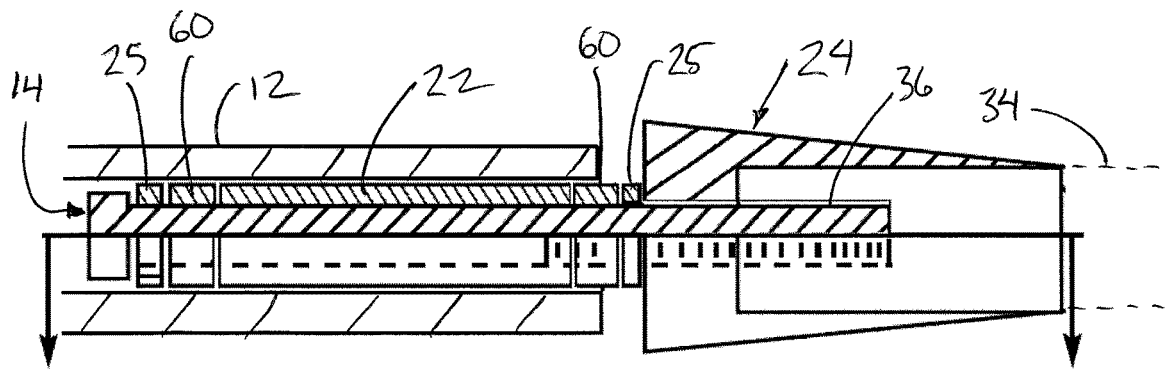
FIG. 3 is a sectional view of the pipe pulling device according to FIG. 1, including another configuration of wear collars supported thereon.
Figure 4:
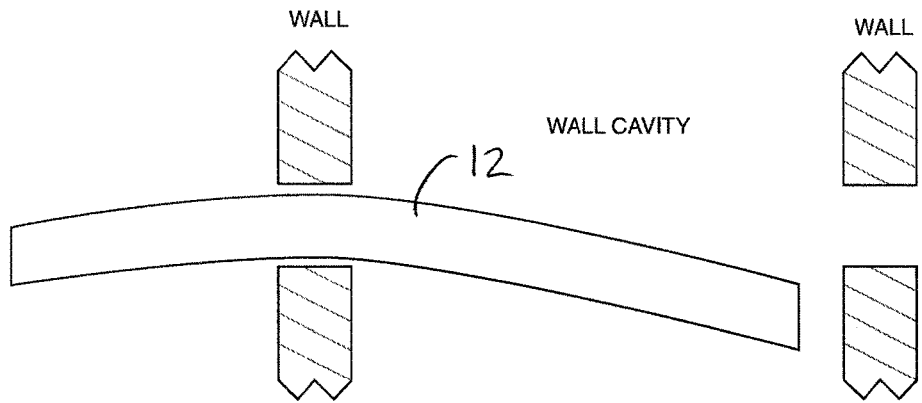
FIG. 4 is a sectional view of a wall cavity receiving conduit tubing therethrough by conventional means when a through hole is provided.

As shown in the embodiment of FIG. 3, a pair of auxiliary collars 60 may be mounted about the main shaft in abutment with opposing ends of the expansion sleeve in place of the wear collars 54 noted above. Each auxiliary collar 60 also comprises a rigid collar having an outer diameter near to the outer diameter of the expansion sleeve in the relaxed state to protect the end of the expansion sleeve. The auxiliary collars 60 differ from the wear collars 54 only by the absence of a sleeve portion 58, but otherwise serve the same function.

Each of the wear collar 54 in the auxiliary collar 60 can be provided in different sizes for accommodating different sizes of the pipe pulling device which are used for different sizes of conduit tubing.

The kit of parts used for assembling the pipe pulling device 10 may further include a rod adapter body 62 which is substantially identical to the tip of body 34 described above with regard to connection to the fastener body 14 and the nut 24, but instead of the mounting bore 46 which accommodates a needle tip therein, a threaded socket 64 is provided at the apex of the rod adapter body 62 which forms a threaded connection to the threaded male connector at the end of a fiberglass rod 66 of the type used for guiding materials through building structures. Typically, the fiberglass rod 66 is assembled from a plurality of modular sections which are connected using threaded connectors in the longitudinal abutment in series with one another.

The kit of parts used for assembling the pipe pulling device 10 may additionally include a clevis tip body 68 which is substantially identical to the tip body 34 with regard to connection to the fastener body 14 and the nut 24, but instead of a tip portion 38 which tapers to an apex, the clevis tip body instead locates a clevis mount 70 at the outer end thereof which is adapted for receiving a spade bit 72 therein as well as a transverse retainer pin 74 inserted through cooperating apertures in the clevis mount 70 and the spade bit 72 to selectively retain the spade bit coupled to the clevis tip body 68.

The kit of parts used for assembling the pipe pulling device 10 may additionally include a tapered adapter body 76 having a frustoconical outer surface extending from an outer diameter at a first end approximately equal to the outer diameter of a first set of modular sections of the tip body having a first constant diameter, to an outer diameter at a second end which is reduced relative to the first end so as to be equal to the outer diameter of a second set of modular sections of an alternative tip body having a second constant diameter less than the first constant diameter. Threaded connectors are provided as internally threaded sockets at both ends of the tapered adapter body 76 which are configured for threaded connection with the corresponding threaded connectors at opposing ends of the modular sections of the different sets of tip body sections 52. In this manner, a series of components can be interconnected in series including (i) a nut 24 which provides a first tapered reduction in outer diameter from the outer diameter of the conduit tubing to the outer diameter of a first tip body, (ii) a first constant outer diameter tip body section matching the reduced outer diameter of the nut 24, (iii) an adapter body 76 providing a second tapered reduction an outer diameter from the first constant outer diameter to a second constant outer diameter, and (iv) a second constant outer diameter tip body section matching the reduced outer diameter of the adapter body.

As shown in FIGS. 28 through 33, the components of the kit of parts forming the pipe pulling device 10 may be available in a plurality of different sizes for accommodating different tubing diameters, different tubing types, and different building materials and structures to be traversed, etc.

In use, the body of the device is initially inserted into the PEX™ Tubing. Turning the taper compression nut then applies force to the ends of the compression medium. This in turn causes the compression medium to be forced outward against the inner diameter of the PEX™ Tubing, creating a firm connection between the PEX™ Tubing and the pip pulling device. If a more firmer connection is needed between the pipe pulling device and the inner diameter of PEX™ Tubing, the taper compressing nut has groves cut into the peripheral diameter for better hand gripping and two flats perpendicular to each other for easier mechanical turning.

In some embodiments, the nut and the needle portion of the pipe pulling device are one piece. The approximate overall length of 14½ inches to accommodated the building standard of 16 inch centres on floors and walls. In other embodiments, a shorter body to allows extensions to be added to its length giving it more versatility to go into unconventional wall and floor cavities. It should be noted that some embodiments can accommodate the various interchangeable tips described in the figures above.

The compressing nut along with all adapters and tips are tapered. This is so that when being pull or pushed through wall or floor cavities nothing can get caught on any obstruction, shoulder or edge. This also prevents damaging the pipe pulling device or building structure. If by chance the pipe pulling device and PEX™ Tubing do become separated in the building cavity the advantage of this procedure can be lost.

Once this pipe pulling device is firmly attached to the end of the PEX™ Tubing you have a couple of options.

Figure 5:
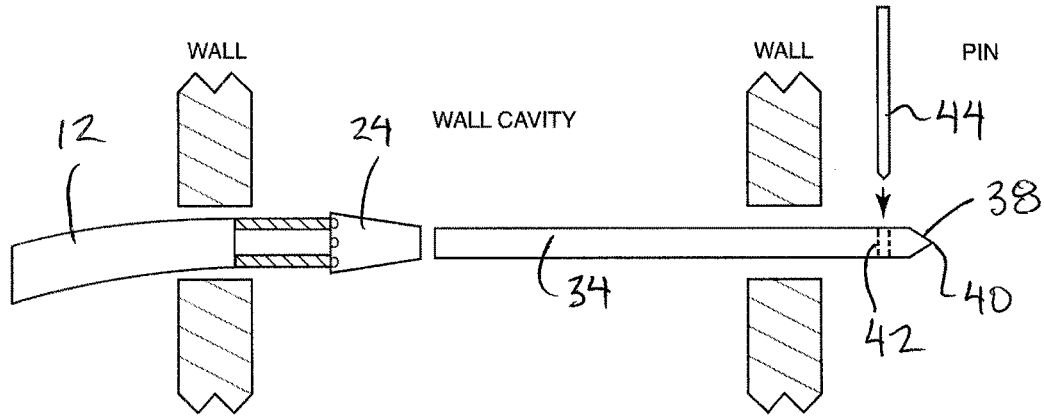
FIG. 5 and FIG. 6 are sectional views of the wall cavity of FIG. 4 using the pipe pulling device to insert conduit tubing therethrough.
Figure 6:
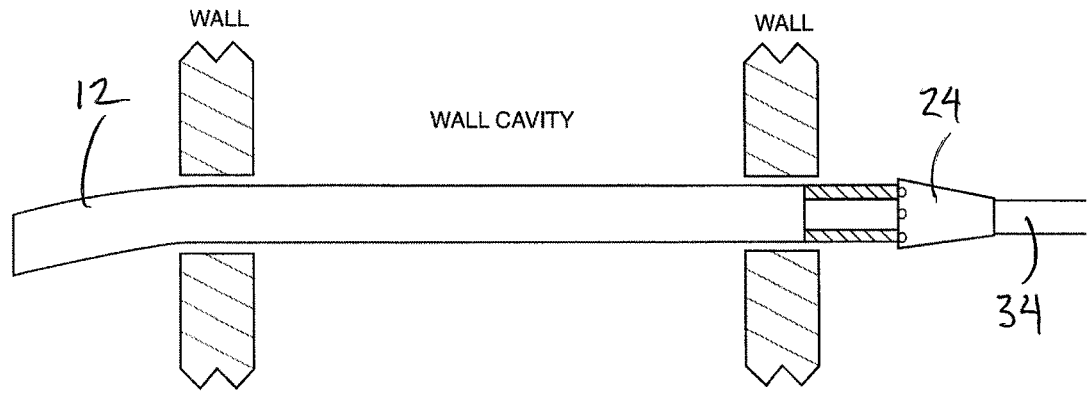
Figure 7:
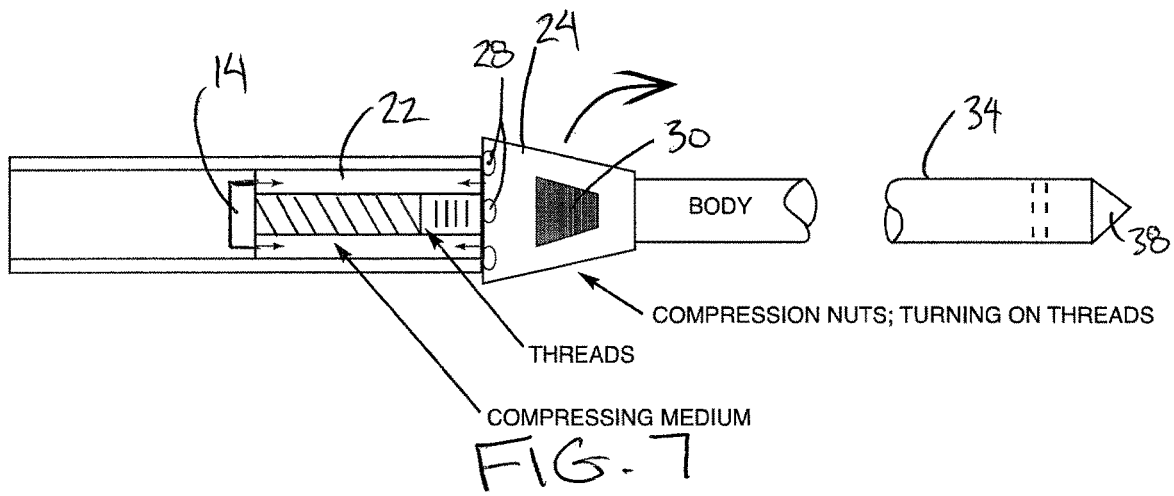
FIG. 7, FIG. 8 and FIG. 9 are sectional views of the pipe pulling device as the expansion sleeve is expanded into the conduit tubing by rotation of the nut of the pipe pulling device.
Figure 8:
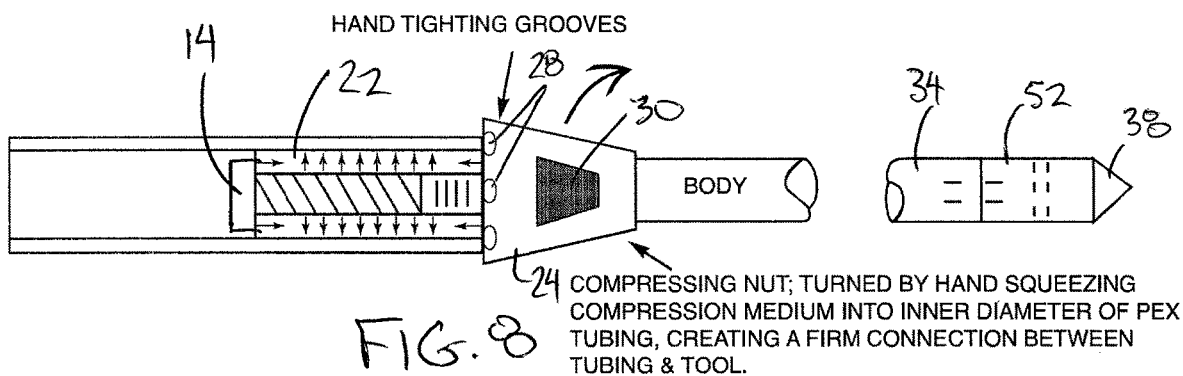
Figure 9:
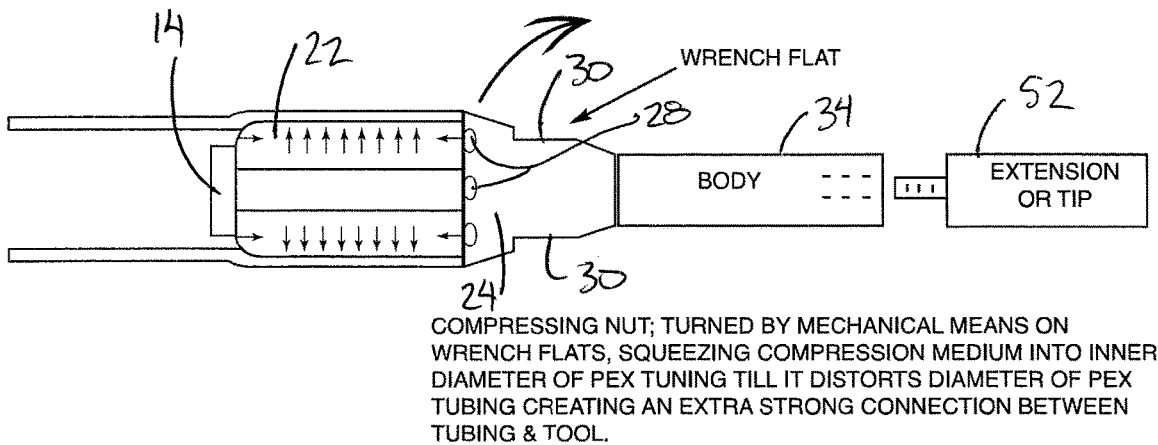

Firstly, you can either push the pipe pulling device/PEX™ Tubing into the cavity through an existing passageway through both wall surfaces of a wall cavity as shown in FIGS. 5 and 6.

Figure 10:
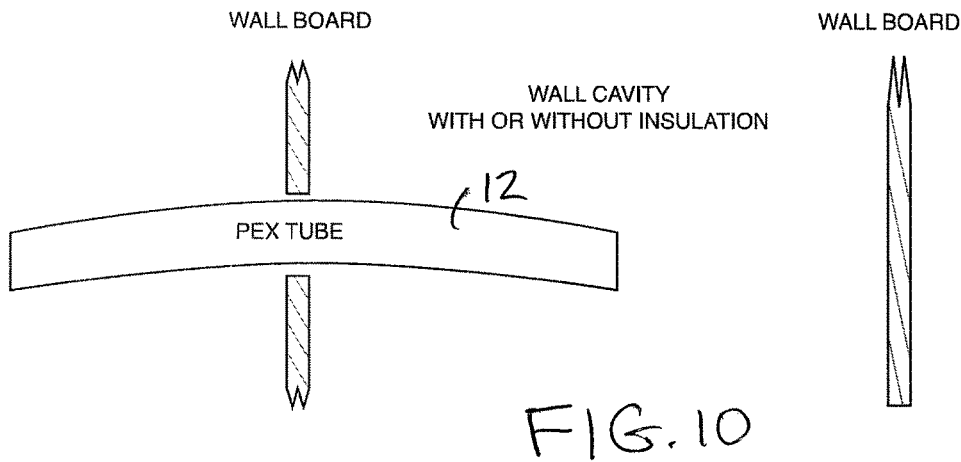
FIG. 10 is a sectional view of a wall cavity receiving conduit tubing therethrough by conventional means in the absence of a through hole.
Figure 11:
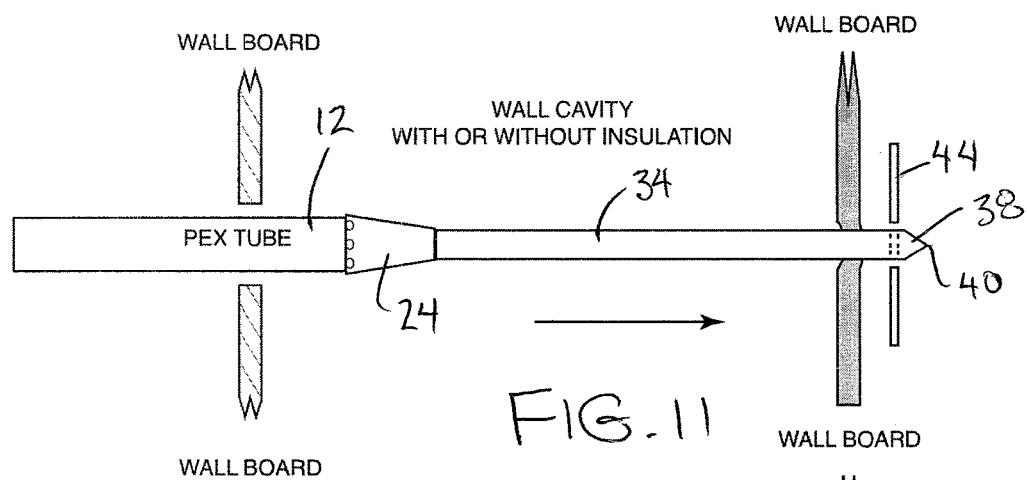
FIG. 11 and FIG. 12 are sectional views of the wall cavity of FIG. 10 using the tip body of the pipe pulling device to puncture a whole in one layer of wall finishing material and using the nut of the pipe pulling device to expand the whole.
Figure 12:
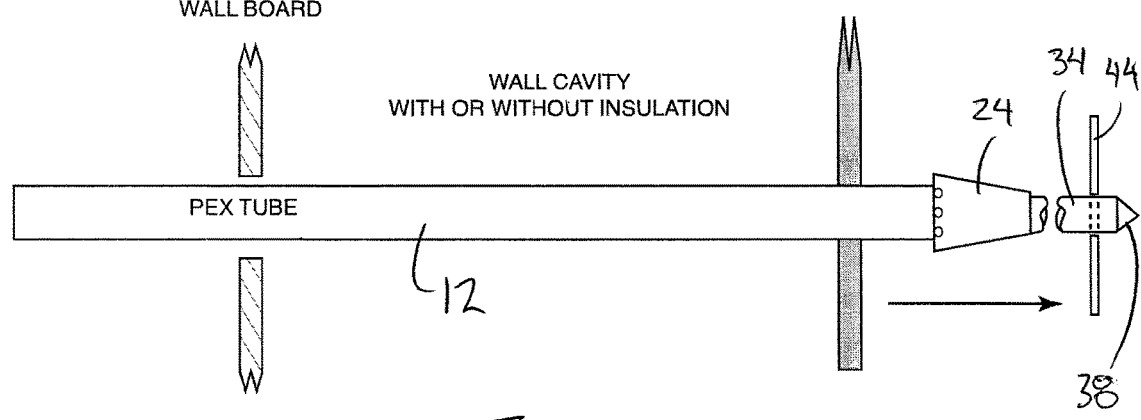
Figure 13:
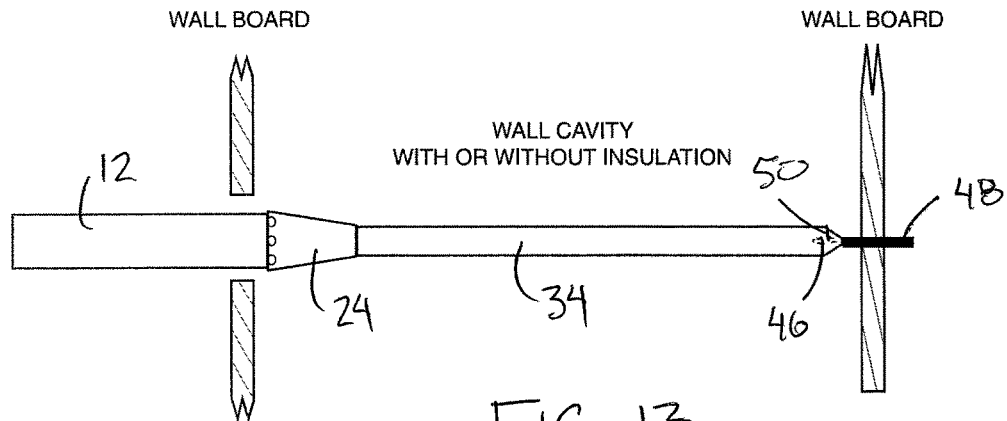
FIG. 13, FIG. 14 and FIG. 15 are sectional views of a wall cavity in which the needle tip of the pipe pulling device is used to puncture a lead hole in one of the layers of wall finishing material, followed by drilling a larger whole about the lead hole to allow insertion of the remainder of the pipe pulling device therethrough.
Figure 14:
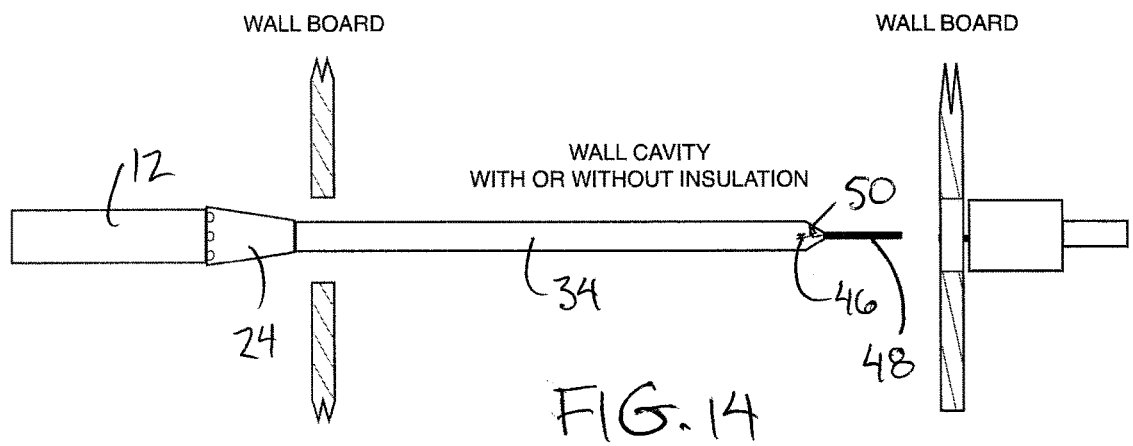
Figure 15:
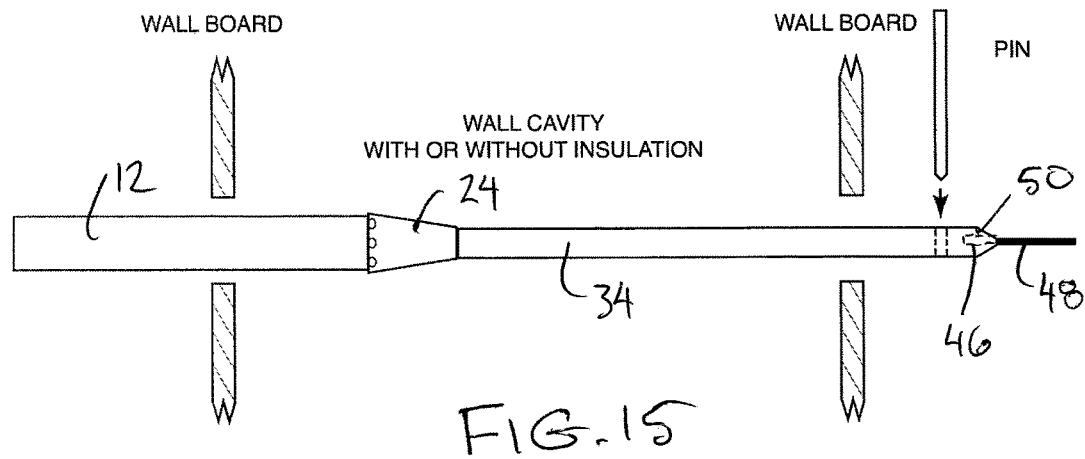

Alternatively, when starting with a hole in only one wall surface of a wall cavity, and if in an acceptable position, punch the probe through the wallboard to the other side, then insert the pull pin into the end of the pipe pulling device and pull the PEX™ Tubing through to the desired length as shown in FIGS. 10 through 12.

Another option if you don't have a hole on the other side of the wall cavity, or need to be precise in the location were the PEX™ Tubing exits without damaging the wallboard, the pipe pulling device is provided with a small hole drilled in the tip to accommodate a locating pin as shown in FIGS.

13 through 15. This pin is small enough that it will not damage the wallboard in case you miss or need to reposition it, as it will only leave a small hole that can be easily repaired. Once located you can easily pull back the pipe pulling device, using the locating pin hole, drill the wallboard out to the appropriate size hole. Once this hole is made you can push the pipe pulling device through, insert the pull pin in the cross drilled hole and pull as much of the PEX™ Tubing you need through the cavity.

Figure 16:
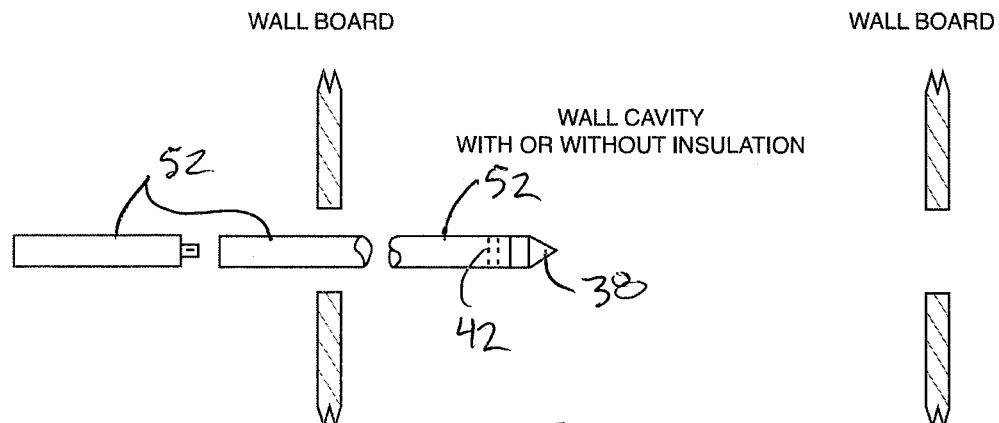
FIG. 16, FIG. 17 and FIG. 18 are sectional views of a wall cavity using assembled modular sections of the tip body to fully span the wall cavity with the length of the tip body.
Figure 17:
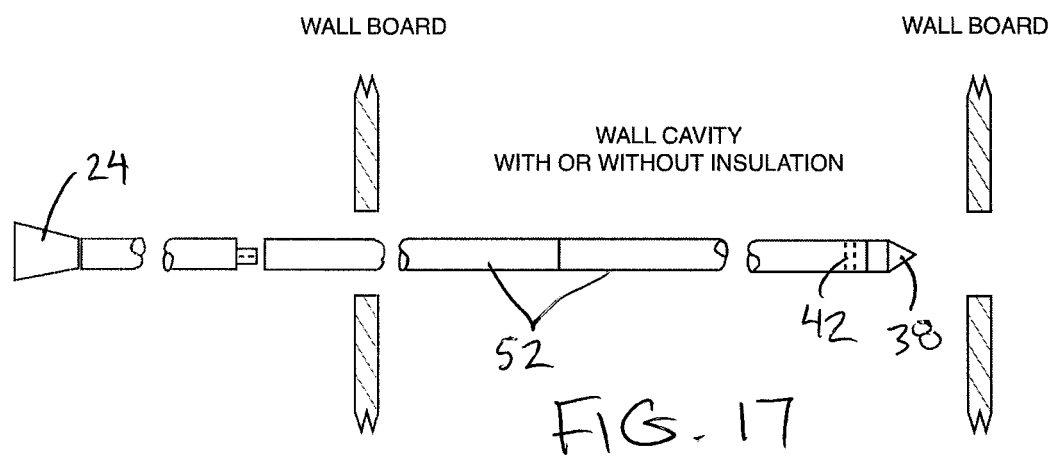
Figure 18:
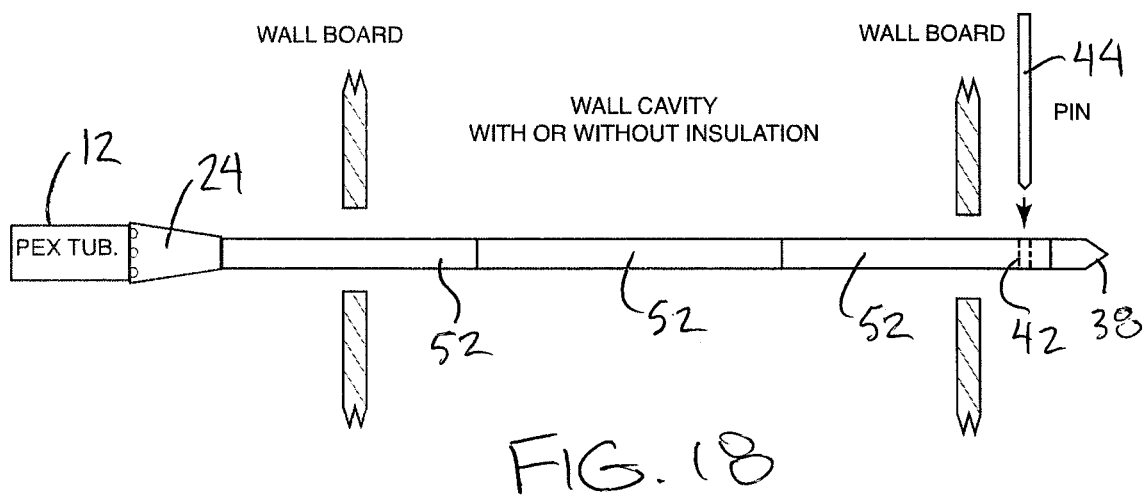
Figure 19:
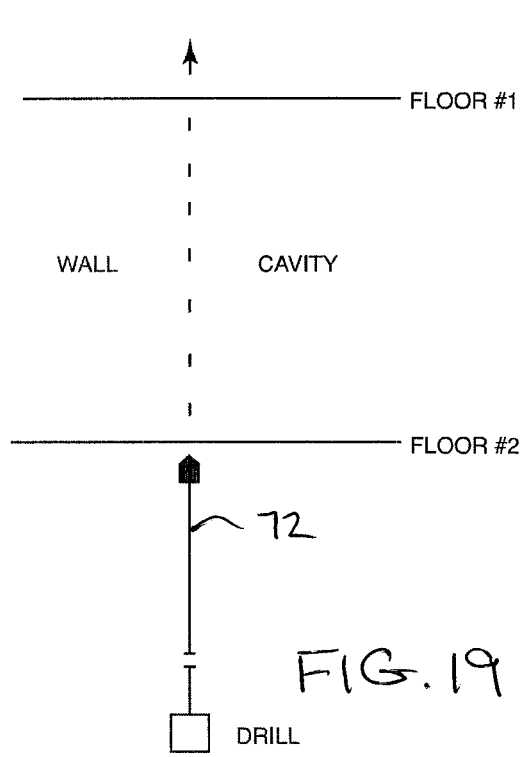
FIGS. 19 through 22 schematically represents the steps of using an elongate spade bit to drill a lead hole across a wall structure, followed by a clevis attachment of the spade bit to the pipe pulling device to draw the pipe pulling device back through the lead hole.
Figure 20:
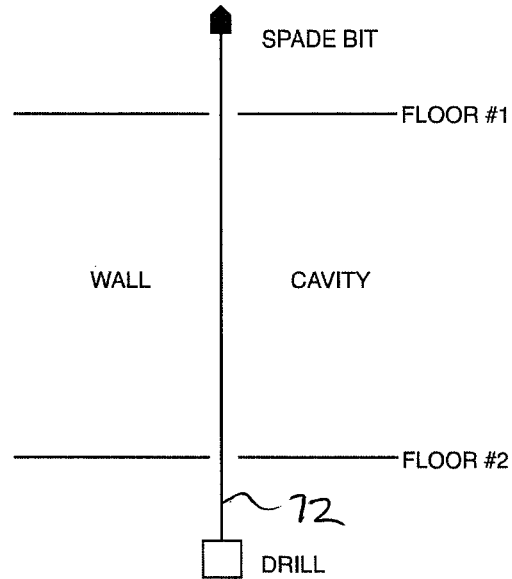
Figure 21:
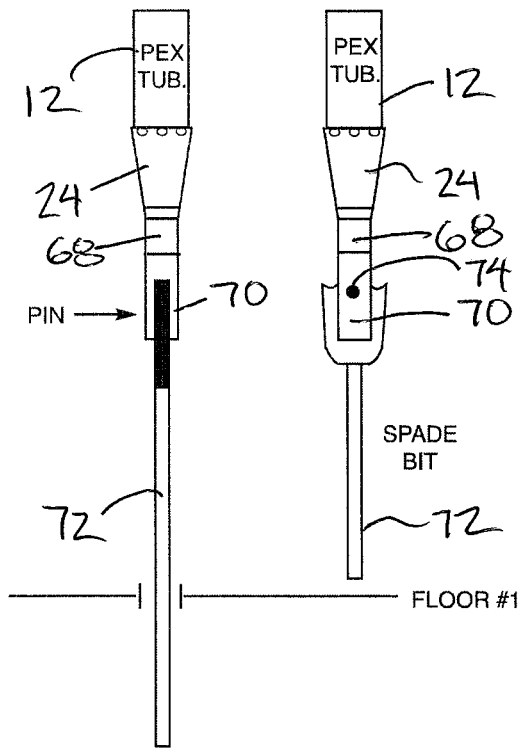
Figure 22:
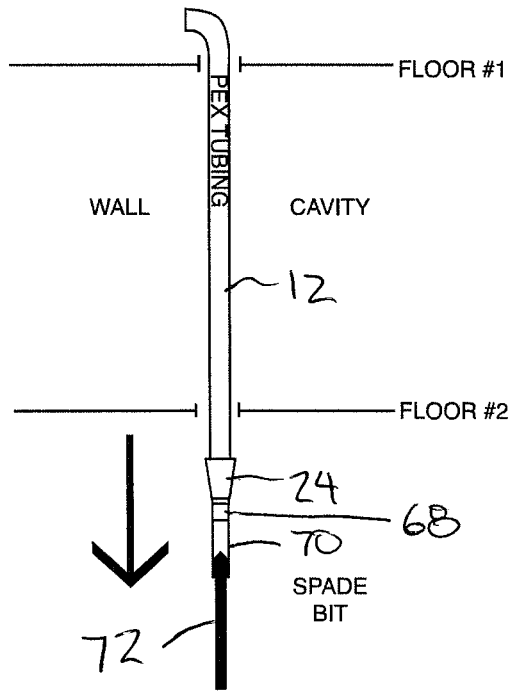
Figure 23:
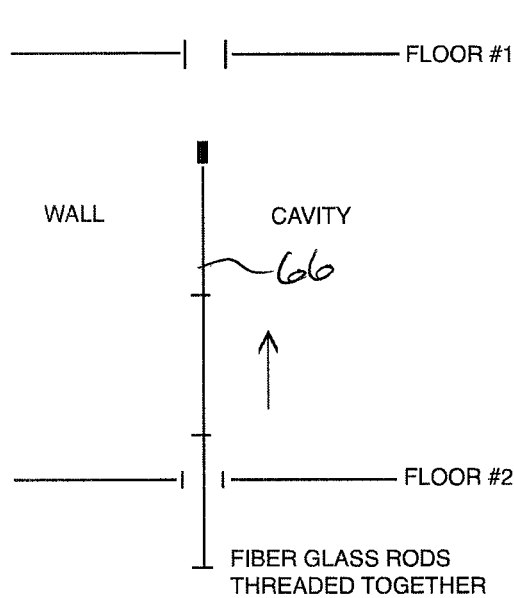
FIGS. 23 through 26 schematically represent the steps of using a series of fiberglass rods mounted in series with one another to span a passage through a wall structure, followed by a threaded attachment of the pipe pulling device to the fiberglass rods to draw the pipe pulling device back through the passage through the wall structure.
Figure 24:
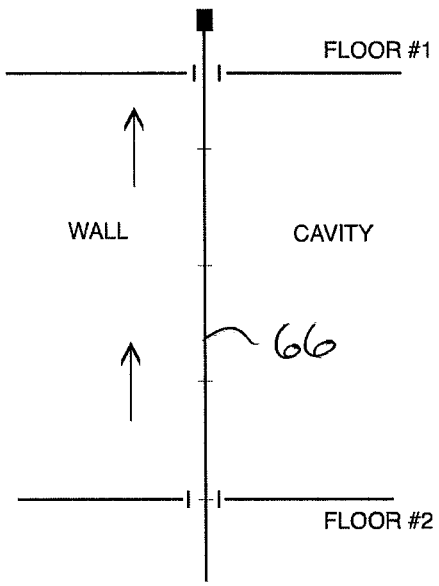
Figure 25:
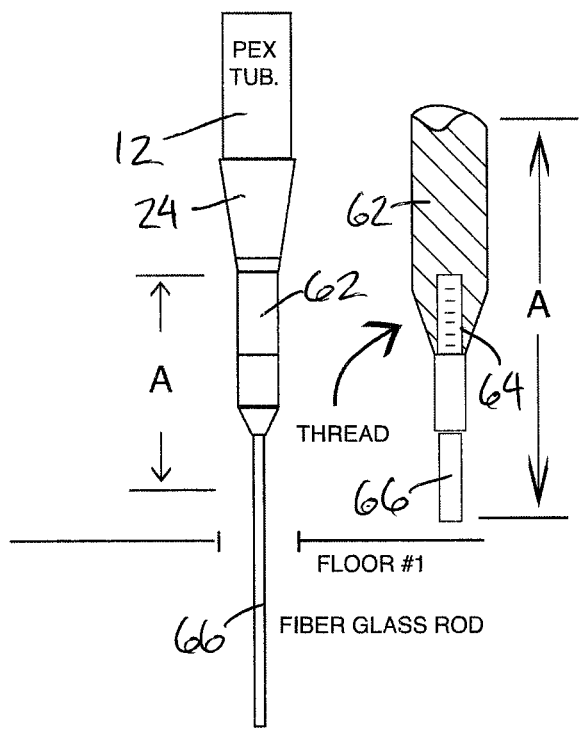
Figure 26:
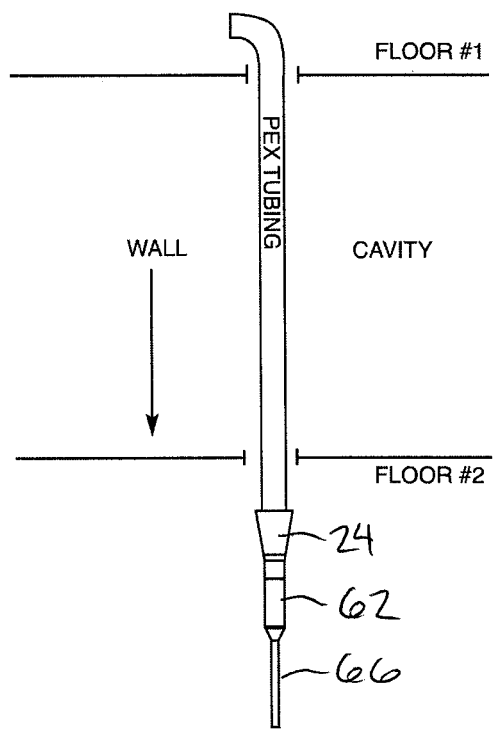
Figure 27A:
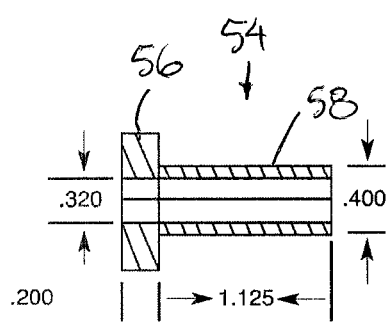
FIGS. 27A to 27G illustrates a plurality of wear collars which can be optionally mounted on the pipe pulling device as shown in FIGS. 2 and 3.
Figure 27B:
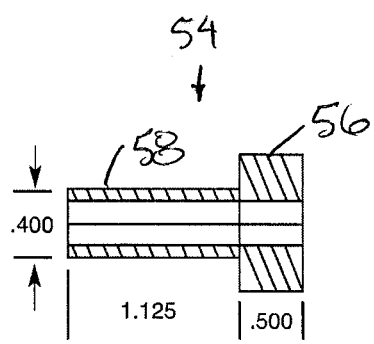
Figure 27C:
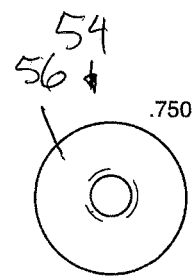
Figure 27D:
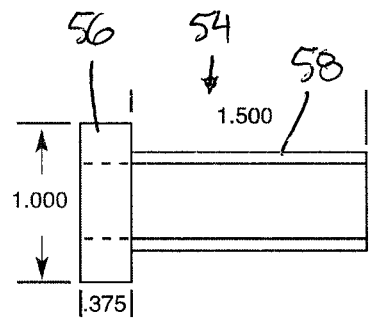
Figure 27E:
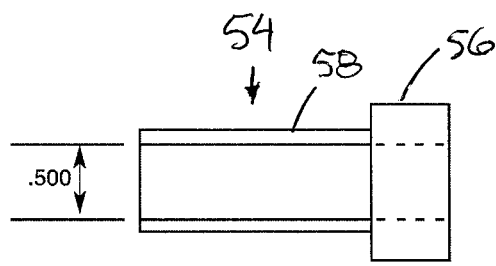
Figure 27F:
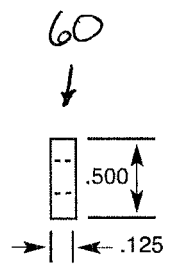
Figure 27G:
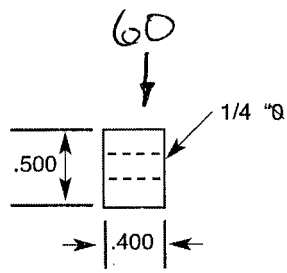
Figure 28:
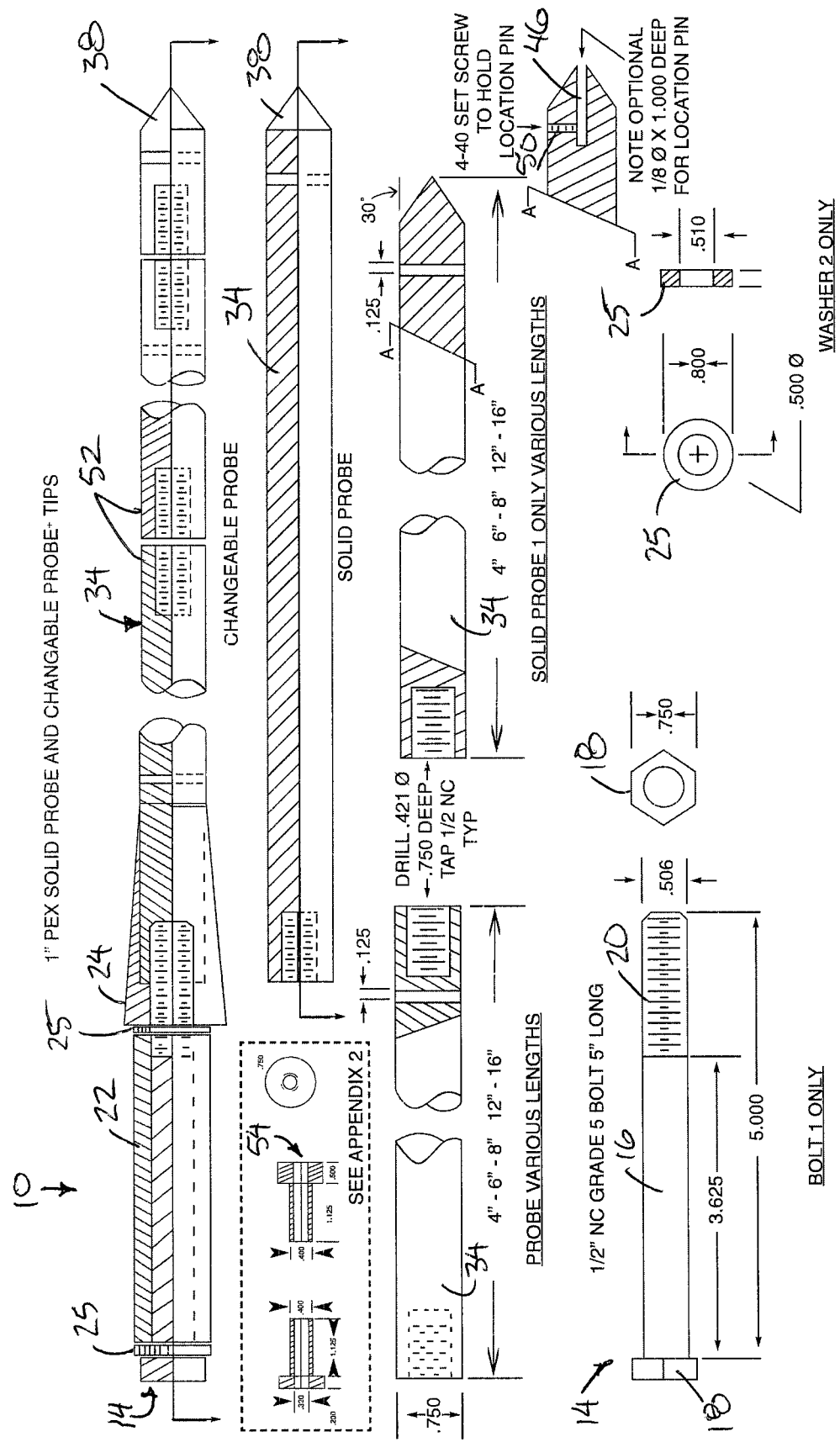
FIGS. 28 through 33 illustrated various kit of parts corresponding to different sizes of conduit tubing and the tip bodies and illustrating various optional accessories which can be used within each kit of parts.
Figure 29:
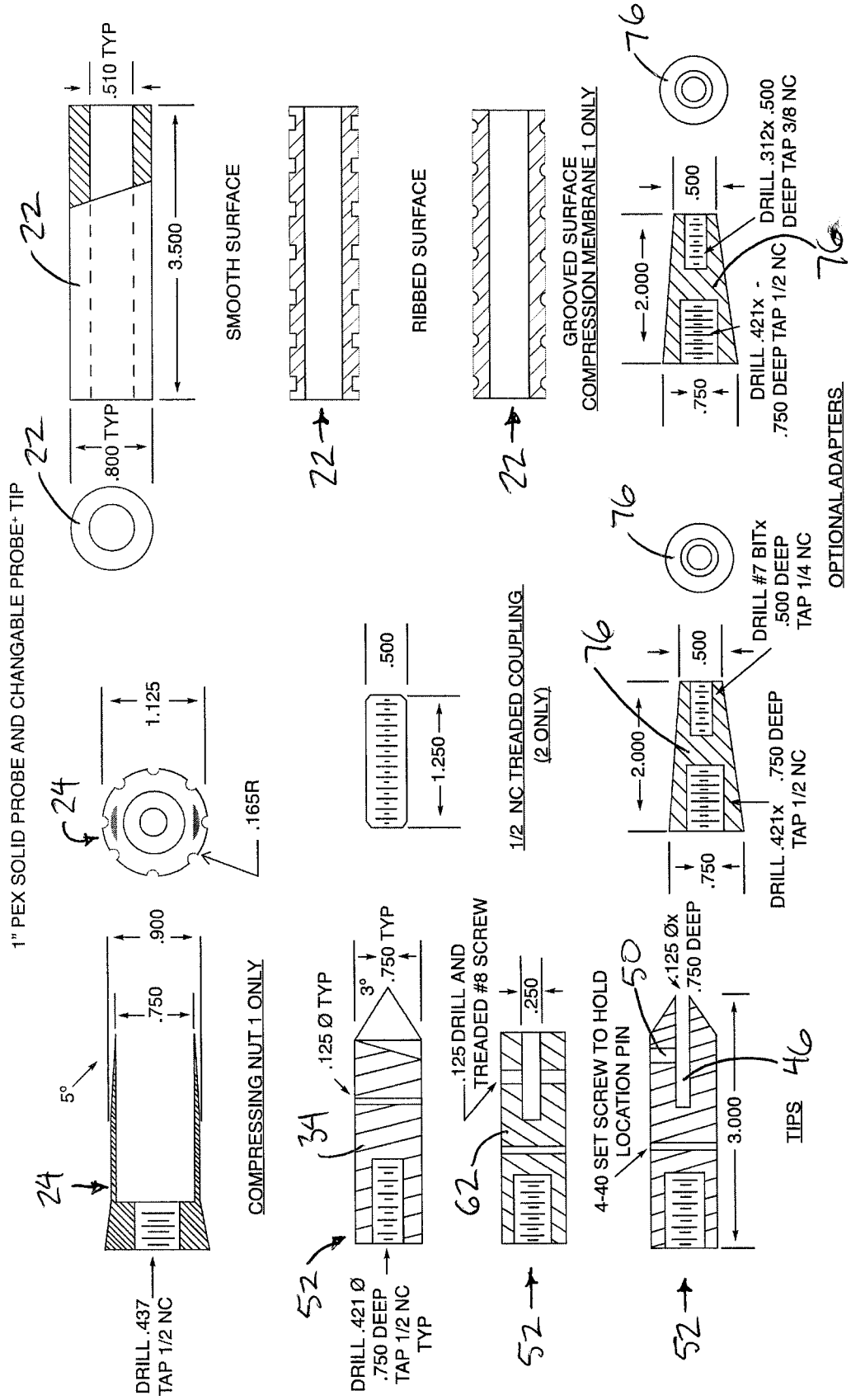
Figure 30:
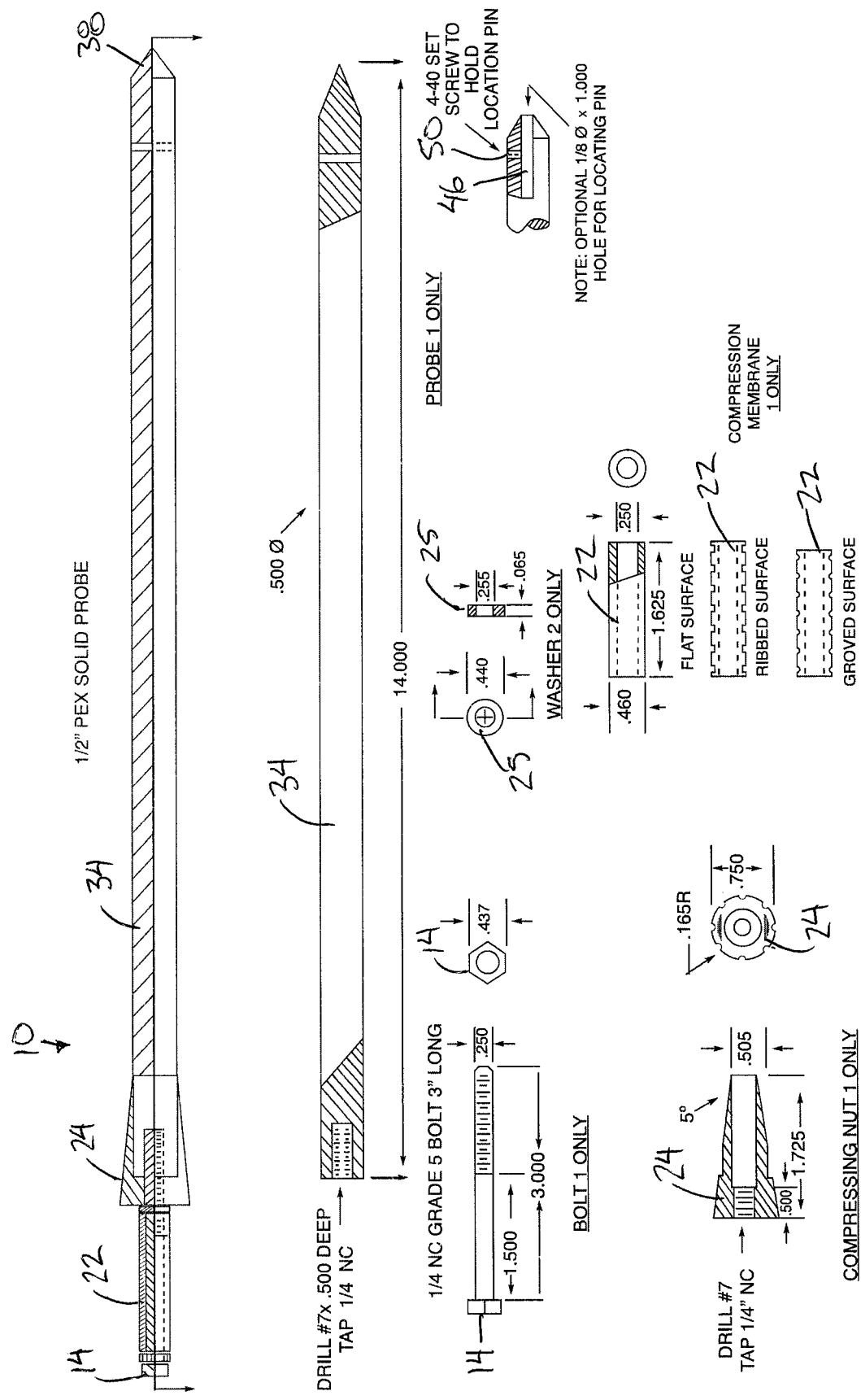
Figure 31:
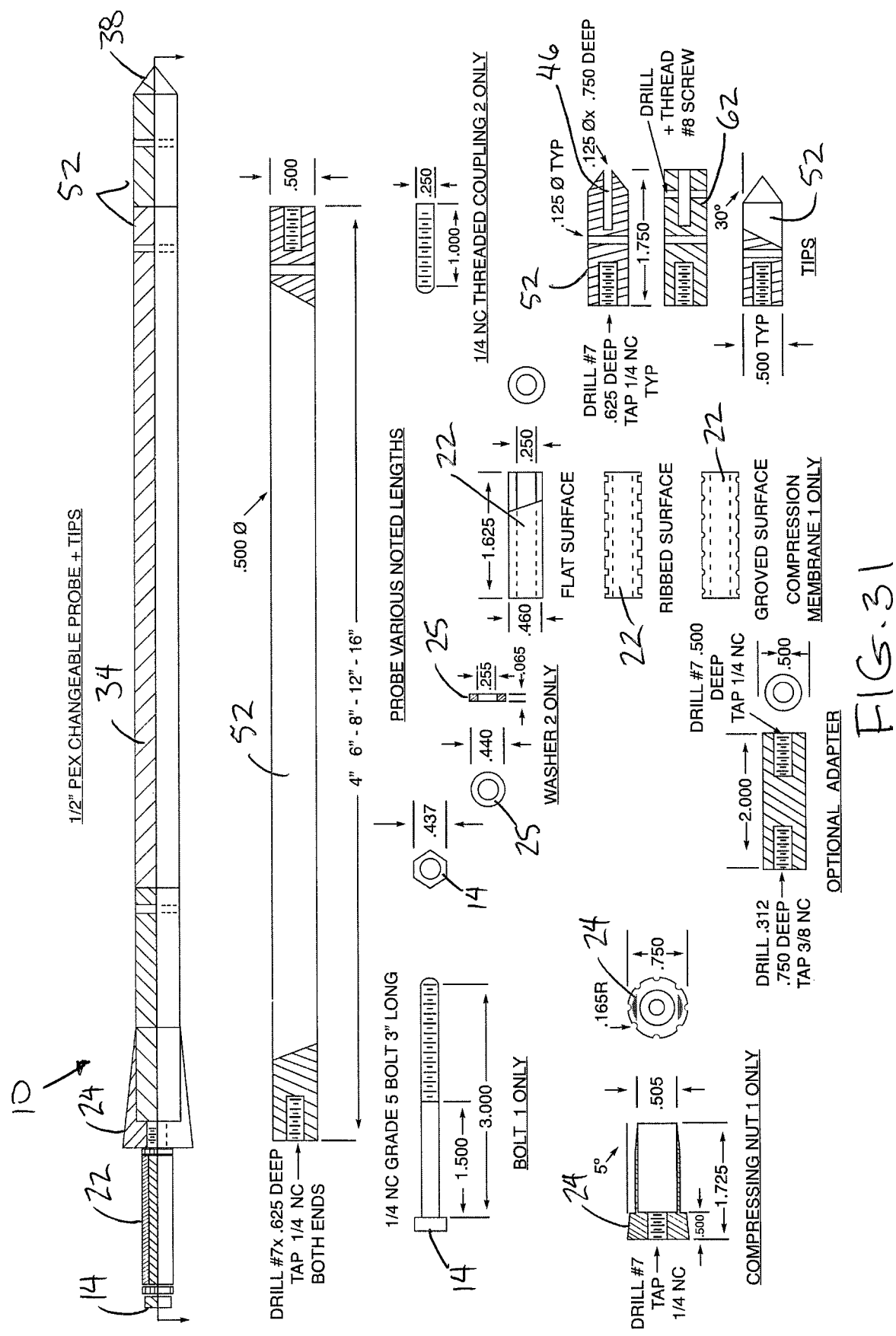
Figure 32:
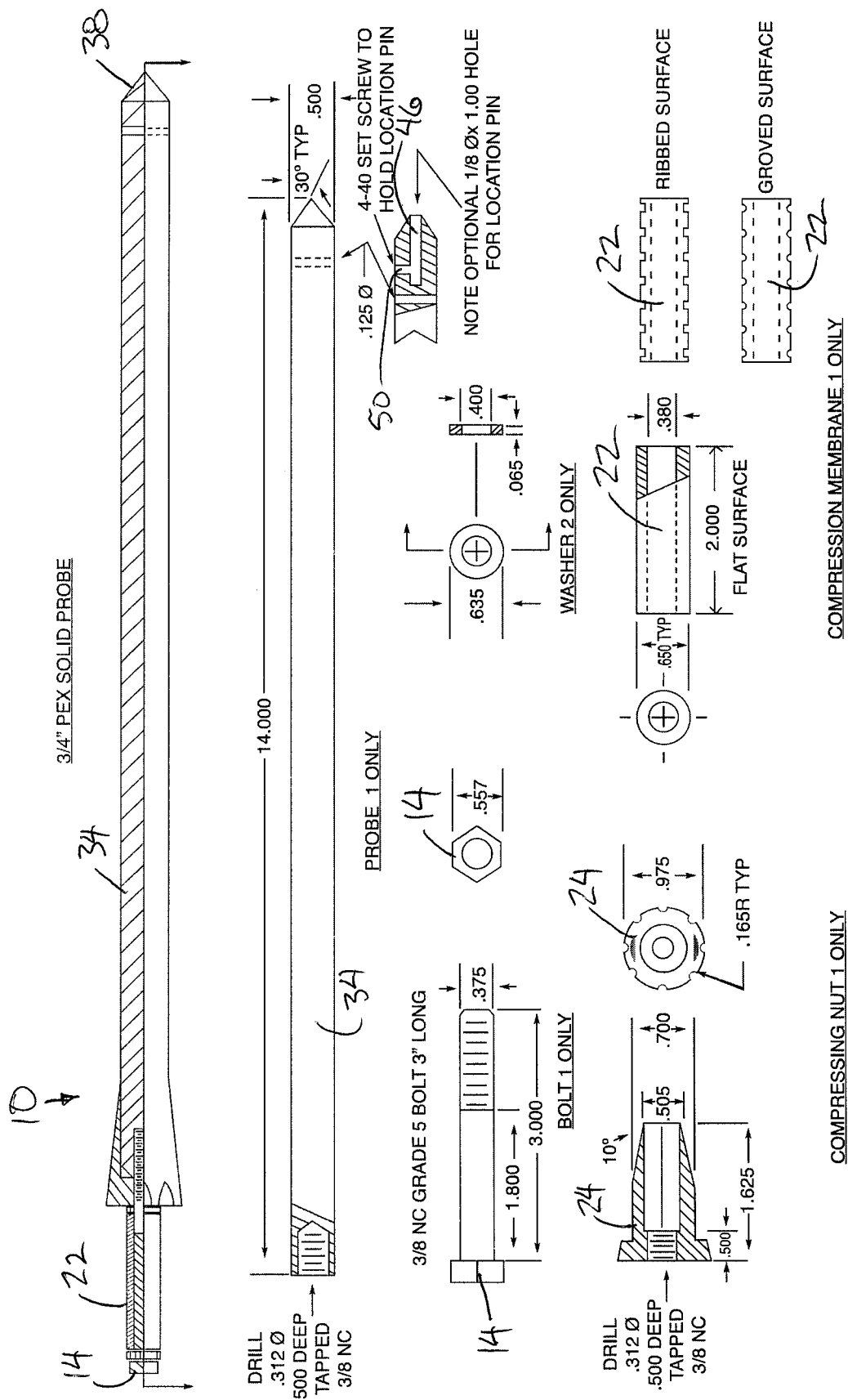
Figure 33:
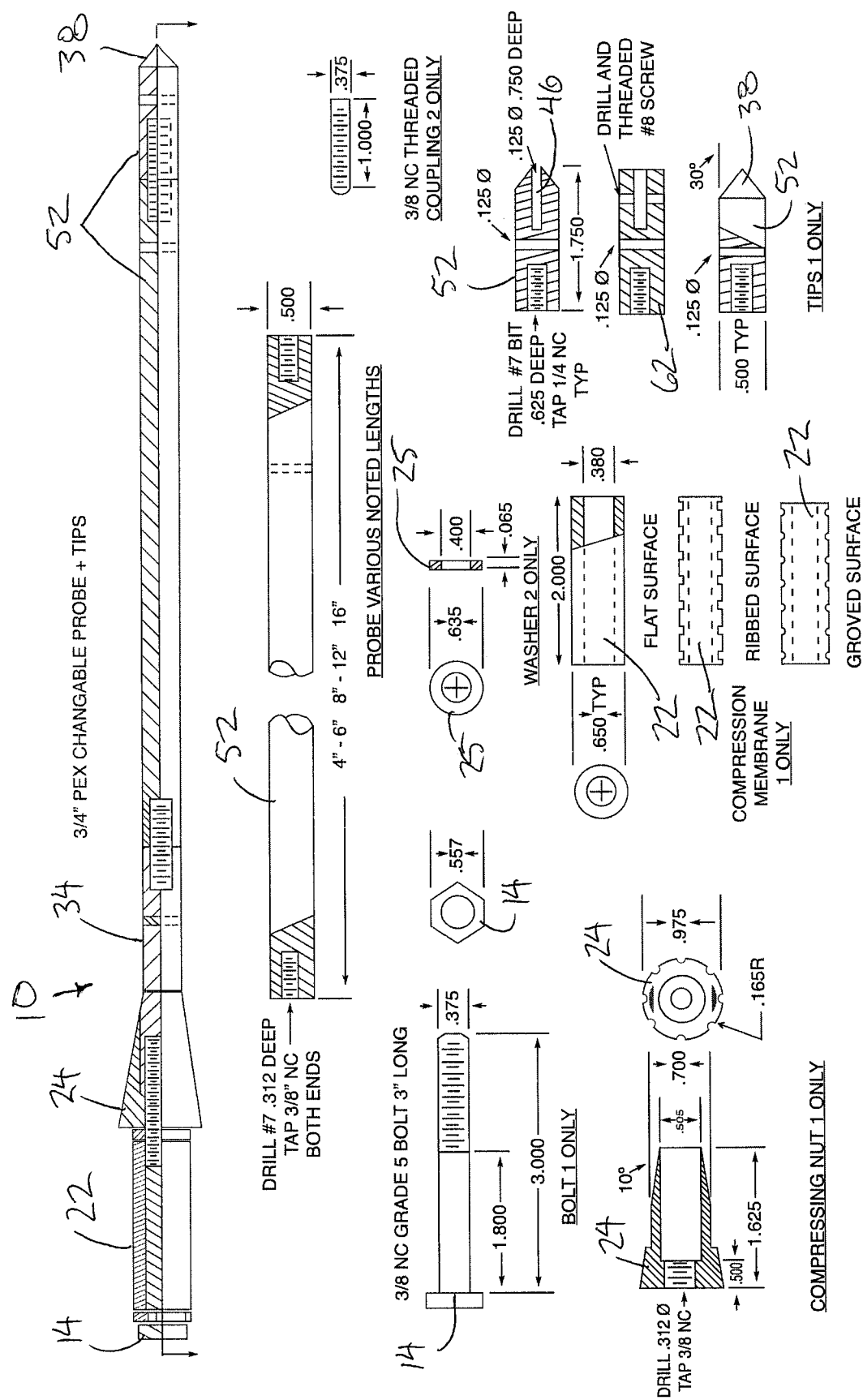

You will at times have a building cavity where you can see right through one hole over to the other, but because of the distance and the PEX™ Tubing's natural curvature the tubing will not line up with the opposite hole. This is when the pipe pulling device have modular extensions can be used. By using a pointed tip with a series of threaded extensions, as shown in FIGS. 16 through 18, as many as needed to traverse through the building cavity. Once this is accomplished, the pipe pulling device body attaches to the PEX™ Tubing and is then threaded to the extension allowing with the aid of the pull pin to pull as much PEX™ tubing as needed through the building cavity.

A popular method of installing PEX™ Tubing through large building cavities, such as from floor to floor is to use a long-shafted spade bit. Use of a spade a bit together with the pipe pulling device is illustrated in FIGS. 19 through 22. After drilling the first hole, it is then pushed through the building cavity, drilling the second hole at the opposing side of the wall cavity. The pipe pulling device is attached to the PEX™ Tubing using a clevis tip screwed onto the body of the pipe pulling device. The spade bit is inserted into the clevis and a pin is inserted through the clevis and the tip of the spade bit. These spade bits are typically designed to have a wire or other device secured to the tip. Once every thing is attached, the drill bit is pulled through, carrying the PEX™ Tubing with it through the building cavity. Once through the drill bit is detached from the clevis allowing the desired amount of PEX™ Tubing, to be pulled or push through.

This clevis tip can also accommodate different types of fish tapes, etc. When holes are drilled on both sides of a large building cavity it is common to use a fiberglass wire running kit to traverse these spaces. Use of fiberglass rods together with the pipe pulling device 10 is shown in FIGS. 23 through 26. These small but robust rods are threaded together and inserted into the building cavity until they traverse to the hole on the opposite side. Once through, the end of the fiberglass rod has a male end that is then threaded into the female end of the adapter tip. This adapter tip is threaded into the body of the pipe pulling device onto which has been attached to the PEX™ Tubing. Once attached, the fiberglass rods are pulled through to bring the pipe pulling device and PEX™ Tubing with it. Once the tubing is through the rods are removed and the rest of the PEX™ Tubing needed is pulled through.

The following components of the pipe pulling devices can be constructed out of the listed materials, or other material with similar functionality: (i) Body, needle portion, Tips and Adapters: Steel, Stainless Steel, Aluminium, Plastics, Fiber Composites; and (ii) Compression medium: Rubber or any kind of compressible material with a high coefficient of friction, having a surface which is smooth, rough, ribbed or grooved.

The use of the wear collars 54 and 60 provide a further embodiment of the pipe pulling device which is suited for use with Corrugated Stainless Steel Tubing Gas conduit. This embodiment can use all the extensions and adapters associated with the pipe pulling device. The only difference is a larger compression nut and two bushings that separate the compressions membrane from the threaded rod. These bushings when pulled together compress the membrane forcing it out against the inner diameter of the tubing. It should be noted that these bushings can also be used in the pipe pulling device for the same purpose. Also, one of the bushings that presses against the compression nut is longer than the other one. This is to interact with the sharp cut of the tubing.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A pipe pulling device for guiding conduit tubing through a building structure, the pipe pulling device comprising:
   a fastener body including a main shaft having a shaft diameter extending longitudinally between a head at a first end of the main shaft which is enlarged relative to the shaft diameter and an opposing second end of the main shaft in which at least a portion of the main shaft adjacent the second end is externally threaded;
   an expansion sleeve supported about the main shaft having an outer diameter which is receivable within an open end of the conduit tubing;
   a nut threaded onto the second end of the main shaft such that the expansion sleeve is longitudinally abutted between the head of the fastener body and the nut, the nut being longitudinally tapered from a first end of the nut adjacent the expansion sleeve having an outer diameter which is greater than an outer diameter of the conduit tubing to a second end of the nut having an outer diameter which is less than the outer diameter of the first end of the nut;
   the nut including a threaded bore extending longitudinally therethrough in threaded connection to the main shaft of the fastener body and a counter bore at the second end of the nut in axial alignment with the threaded bore;
   the expansion sleeve being adapted to be expanded radially into frictional engagement with the conduit tubing as the expansion sleeve is axially compressed between the head of the fastener body and the nut by threaded engagement between the nut and the fastener body; and
   an elongate tip body including a main portion extending longitudinally from the second end of the nut having a constant outer diameter which is less than the outer diameter of the first end of the nut to a tip portion of the elongate tip body which is distal from the nut and which is tapered to an apex;
   the elongate tip body having an inner end opposite from the tip portion which is received within the counter bore at the second end of the nut;
   the elongate tip body being removable from the nut through the second end of the nut;
   the inner end of the elongate tip body including an internally threaded bore formed therein in threaded connection with the main shaft of the fastener body independently of said threaded connection of the nut with the main shaft of the fastener body.

2. The device according to claim 1 in combination with the conduit tubing, wherein the constant outer diameter of the elongate tip body and the outer diameter of the nut at the second end of the nut is less than the outer diameter of the conduit tubing.

3. The device according to claim 1 wherein the nut has a generally conical tapered outer surface and two gripping surfaces that are parallel to one another and located at diametrically opposed sides of the outer surface for gripping with a wrench.

4. The device according to claim 1 wherein the expansion sleeve is formed of a resilient material.

5. The device according to claim 1 wherein the expansion sleeve has a textured outer surface for gripping the conduit tubing.

6. The device according to claim 1 further comprising a wear collar of rigid material supported about the main shaft of the fastener body in axial abutment between the expansion sleeve and the nut for alignment with a cut edge at an open end of the conduit tubing.

7. The device according to claim 6 wherein the wear collar includes a main portion having an outer diameter near to the outer diameter of the expansion sleeve and a sleeve portion reduced in outer diameter relative to the main portion of the wear collar such that the sleeve portion is arranged to be received radially between the main shaft of the fastener body and the expansion sleeve along a portion of an axial length of the expansion sleeve.

8. The device according to claim 1 wherein the elongate tip body includes a transverse aperture extending diametrically therethrough adjacent to the tip portion of the tip body.

9. The device according to claim 1 wherein the elongate tip body comprises a plurality of modular sections having the constant outer diameter and being supported longitudinally in abutment with one another between the nut and the tip portion, each modular section being connected to adjacent sections by a threaded connection so as to be readily separable to vary an overall length of the elongate tip body.

10. The device according to claim 1 further comprising a needle tip mounted on the apex of the elongate tip body and having a reduced diameter relative to the constant outer diameter of the elongate tip body so as to be suited for penetration through wall finishing material.

11. The device according to claim 10 wherein the needle tip is supported within a bore in the elongate tip body so as to be readily removable from the elongate tip body.

12. The device according to claim 1 further comprising a clevis tip which is arranged to be mounted on the nut interchangeably with the elongate tip body, the clevis tip including a clevis formed thereon which is adapted to be releasably secured to a spade bit.

* * * * *